United States Patent [19]

Hoeschele

[11] 3,896,078

[45] July 22, 1975

[54] STABILIZATION OF POLYMERS CONTAINING POLY(ALKYLENE OXIDE) UNITS

[75] Inventor: Guenther Kurt Hoeschele, Wilmington, Del.

[73] Assignee: E. I. Du Pont De Nemours & Company, Wilmington, Del.

[22] Filed: Dec. 18, 1972

[21] Appl. No.: 316,268

[52] U.S. Cl. ... 260/45.9 NC; 260/45.9 R; 260/75 N; 260/857 PE
[51] Int. Cl. .......................................... C08f 45/60
[58] Field of Search ..... 260/45.9 R, 45.9 NC, 75 N, 260/857 PE

[56] References Cited
UNITED STATES PATENTS

| | | | |
|---|---|---|---|
| 3,023,192 | 2/1962 | Shivers | 260/45.9 R |
| 3,157,619 | 11/1964 | Bell et al. | 260/75 R |
| 3,452,056 | 6/1969 | Sundholm | 260/45.9 R |
| 3,468,975 | 9/1969 | Duxbury et al. | 260/75 N |
| 3,492,368 | 1/1970 | Coover et al. | 260/75 N |
| 3,493,632 | 2/1970 | Okazaki et al. | 260/858 |
| 3,763,109 | 10/1973 | Witsiepe | 260/45.9 R |
| 3,766,146 | 10/1973 | Witsiepe | 260/45.9 R |

FOREIGN PATENTS OR APPLICATIONS

| | | | |
|---|---|---|---|
| 1,017,614 | 1/1966 | United Kingdom | 260/75 R |
| 610,140 | 10/1948 | United Kingdom | 260/858 |

Primary Examiner—Melvyn I. Marquis

[57] ABSTRACT

A stabilized copolyester composition consisting essentially of (a) a multiplicity of recurring long chain units and short chain ester units joined head-to-tail through ester linkages, said long chain ester units being represented by the formula

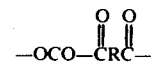

and said short chain units being represented by the formula

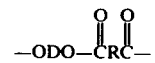

where G is a divalent radical remaining after the removal of terminal hydroxyl groups from a poly(alkylene oxide) glycol having a molecular weight of about 400–6000 and a carbon to oxygen ratio of about 2.0–4.3; R is a divalent radical remaining after removal of carboxyl groups from a dicarboxylic acid having a molecular weight less than about 300 and D is a divalent radical remaining after removal of hydroxyl groups from a diol having a molecular weight less than about 250; provided said short chain ester units amount to about 15–95% by weight of said copolyester and (b) an effective concentration of amide linkages which on hydrolysis yield a primary amino group and a carboxyl group. Optionally up to about 5% of an antioxidant may also be present. In a specific embodiment of the instant invention the amide linkages are introduced during the preparation of the copolyetherester which assures the ultimate in uniformity of distribution and avoids a separate blending step.

10 Claims, No Drawings

STABILIZATION OF POLYMERS CONTAINING POLY(ALKYLENE OXIDE) UNITS

BACKGROUND OF THE INVENTION

Linear copolyesters have been produced heretofore for various purposes, particularly for the production of films and fibers, but the known polymers of this type have not been as effective as would be desired for certain applications. In particular, certain polymers of this type did not possess superior tear strength, tensile strength, flex life and abrasion resistance which would be required for many uses such as hydraulic hose and cable coverings. Recently, a copolyetherester has been discovered which possesses such properties. Although this copolyetherester is significantly superior to those previously known in the art in many regards, it has presented a problem with regard to resistance to oxidative degradation. That is to say, with prolonged exposure to temperatures above about 120°C the copolyetherester has tended to degrade. For applications such as those in the hydraulic hose and wire insulation fields where temperatures above 120°C up to about 180°C are often encountered, an improvement in the thermostability of the copolyetherester is necessary to avoid this problem of oxidative degradation.

SUMMARY OF THE INVENTION

According to this invention there is provided an improved copolyetherester composition which has greatly enhanced resistance toward oxidative degradation of the polymer, in particular degradation at temperatures of about 120° to 200°C. This improvement is accomplished by incorporating into the polymer amide linkage-containing materials in amounts providing up to about 6.5 weight per cent of the copolyetherester composition of amide linkages, preferably about 0.015 to 3.0 weight %. The amide may be present as such in a physical mixture with the copolyetherester and/or it may be present in reacted form as an amide-containing copolyetherester.

The amide linkages are provided by compounds which on hydrolysis yield primary amino groups and carboxyl groups. The primary amino groups and the carboxyl groups can be attached to aliphatic (including cycloaliphatic) or aromatic radicals but compounds derived from aliphatic amines and acids are generally preferred because of their lower melting points, better compatibility and greater effectiveness in preventing degradation. Additionally, in an especially preferred embodiment a suitable antioxidant such as those of the arylamine type or the hindered phenol type can be present in a minor amount, e.g. up to about 5 % by weight of the copolyetherester.

The copolyetherester polymer which is to be improved by the instant invention consists essentially of a multiplicity of recurring intralinear long-chain and short-chain ester units connected head-to-tail through ester linkages, said long-chain ester units being represented by the following structure:

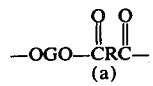
(a)

and said short-chain ester units being represented by the following structure:

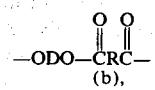
(b), wherein:
G is a divalent radical remaining after removal of terminal hydroxyl groups from poly(alkylene oxide) glycols having a carbon-to-oxygen ratio of about 2.0–4.3 and molecular weight between about 400 and 6000;
R is a divalent radical remaining after removal of carboxyl groups from a dicarboxylic acid having a molecular weight less than about 300; and
D is a divalent radical remaining after removal of hydroxyl groups from a low molecular weight diol having a molecular weight less than about 250,
with the provisos that the short-chain ester units constitute about 15–95% by weight, preferably 25–90% by weight, of the copolyetherester and, ergo, the long-chain ester units constitute about 5 to 85% by weight, preferably 10–75% by weight, of the copolyetherester.

Polymers other than copolyetherester containing poly(alkylene oxide) units can also be stabilized by the presence of amide linkages.

DETAILED DESCRIPTION

The term "long-chain ester units" as applied to units in a polymer chain refers to the reaction product of a long-chain glycol with a dicarboxylic acid. Such long-chain ester units, which are a repeating unit in the copolyetheresters of this invention, correspond to formula (a) above. The long-chain glycols are polymeric glycols having terminal (or as nearly terminal as possible) hydroxy groups and a molecular weight from about 400–6000. The long-chain glycols used to prepare the copolyetheresters of this invention are poly(alkylene oxide) glycols having a carbon-to-oxygen ratio of about 2.0–4.3.

Representative long-chain glycols are poly(ethylene oxide) glycol, poly(1,2- and 1,3-propylene oxide) glycol, poly(tetramethylene oxide) glycol, random or block copolymers of ethylene oxide and 1,2-propylene oxide, and random or block copolymers of tetrahydrofuran with minor amounts of a second monomer such as 3-methyltetrahydrofuran (used in proportions such that the carbon-to-oxygen mole ratio in the glycol does not exceed about 4.3).

The term "short-chain ester units" as applied to units in a polymer chain refers to low molecular weight compounds or polymer chain units having molecular weights less than about 550. They are made by reacting a low molecular weight diol (below about 250) with a dicarboxylic acid to form ester units represented by formula (b) above.

Included among the low molecular weight diols which react to form short-chain ester units are aliphatic, cycloaliphatic, and aromatic dihydroxy compounds. Preferred are diols with 2–15 carbon atoms such as ethylene, propylene, tetramethylene, pentamethylene, 2,2,dimethyltrimethylene, hexamethylene, and decamethylene glycols, dihydroxy cyclohexane, cyclohexane dimethanol, resorcinol, hydroquinone, 1,5-dihydroxy naphthalene, etc. Especially preferred are aliphatic diols containing 2–8 carbon atoms. Included among the bis-phenols which can be used are bis(p-hydroxy) diphenyl, bis(p-hydroxyphenyl) methane, and bis(p-hydroxyphenyl) propane. Equivalent ester-forming derivatives of diols are also useful (e.g., ethylene oxide or ethylene carbonate can be used in place of ethylene glycol). The term "low molecular weight diols" as used herein should be construed to include such equivalent ester-forming derivatives; provided, however, that the molecular weight requirement pertains to the diol only and not to its derivatives.

Dicarboxylic acids which are reacted with the foregoing long-chain glycols and low molecular weight diols to produce the copolyesters of this invention are aliphatic, cycloaliphatic, or aromatic dicarboxylic acids of a low molecular weight, i.e., having a molecular weight of less than about 300. The term "dicarboxylic acids" as used herein, includes equivalents of dicarboxylic acids having two functional carboxyl groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyester polymer formation and use of the polymer of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals sor divalent radicals such as —O— or —SO$_2$—.

Representative aliphatic and cycloaliphatic acids which can be used for this invention are sebacic acid, 1,3-cyclohexane dicarboxylic acid, 1,4-cyclohexane dicarboxylic acid, adipic acid, glutaric acid, succinic acid, carbonic acid, oxalic acid, azelaic acid, diethylmalonic acid, allylmalonic acid, 4-cyclohexene-1,2-dicarboxylic acid, 2-ethylsuberic acid, 2,2,3,3-tetramethylsuccinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4'-methylenebis-(cyclohexane carboxylic acid), 3,4-furan dicarboxylic acid, and 1,1-cyclobutane dicarboxylic acid. Preferred aliphatic acids are cyclohexane-dicarboxylic acids and adipic acid.

Representative aromatic dicarboxylic acids which can be used include terephthalic, phthalic and isophthalic acids, bi-benzoic acid, substituted dicarboxy compounds with two benzene nuclei such as bis(p-carboxyphenyl) methane, p-oxy(p-carboxyphenyl) benzoic acid, ethylene-bis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and C$_1$–C$_{12}$ alkyl and ring substitution derivatives thereof, such as halo, alkoxy, and aryl derivatives. Hydroxyl acids such as p($\beta$-hydroxyethoxy) benzoic acid can also be used providing an aromatic dicarboxylic acid is also present.

Aromatic dicarboxylic acids are an especially preferred class for preparing the copolyetherester polymers of this invention. Among the aromatic acids, those with 8–16 carbon atoms are preferred, particularly the phenylene dicarboxylic acids, i.e., phthalic, terephthalic and isophthalic acids and their dimethyl derivatives.

It is preferred that at least about 50% of the short segments are identical and that the identical segments form a homopolymer in the fiber-forming molecular weight range (molecular weight > 5000) having a melting point of at least 150°C. and preferably greater than 200°C. Polymers meeting these requirements exhibit a useful level of properties such as tensile strength and tear strength. Polymer melting points are conveniently determined by differential scanning calorimetry.

The short-chain ester units will constitute about 15–95 weight % of the copolyetherester. The remainder of the copolyetherester will be the long segments, ergo the long segment will comprise about 5–85 weight % of the copolyetherester. Copolyetheresters in which the short-chain units comprise 25–90 weight percent with 10–75 weight % long-chain units are preferred.

The copolyetherester is modified by the presence of an effective amount up to about 6.5 weight % of amide linkages preferably 0.15 to 5.0 weight % of amide linkages and most preferably 0.5 to 3.0 weight %. Copolyetherester compositions containing more than 6.5 weight % of amide linkages still exhibit improved resistance to oxidative degradation but they are usually not as good as compositions containing less than about 6.5 weight % amide. In addition compositions containing more than 6.5 weight % amide linkages have significantly different properties which are often inferior to the properties of the compositions of this invention.

The amide linkages on hydrolysis must yield a primary amino group and a carboxyl group. As previously indicated, the primary amino group and the carboxyl group may be attached to aliphatic (including cycloaliphatic) or aromatic radicals. The amide linkages

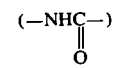

in substantially all of the amides which can be used in the instant invention occur in structures which can be represented by the general formula

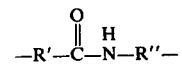

wherein R' is a C$_1$–C$_{40}$ aliphatic hydrocarbon radical or substituted aliphatic hydrocarbon radical or a C$_6$–C$_{20}$ aromatic hydrocarbon radical or a substituted aromatic hydrocarbon radical and R'' is a C$_2$–C$_{40}$ aliphatic hydrocarbon radical or substituted aliphatic hydrocarbon radical or a $C_6$–$C_{20}$ aromatic hydrocarbon radical or substituted aromatic hydrocarbon radical. R' and R'' may be the same or different. Amides in which R' and R'' are both aliphatic (including cycloaliphatic) radicals are preferred.

Preferred ranges for R' and R'' are $C_6$–$C_{20}$ aromatic, $C_2$–$C_{12}$ aliphatic and $C_4$–$C_{16}$ cycloaliphatic.

The amide linkages required in the present compositions can be supplied by adding mono- or polyamides to the copolyetherester during or after its preparation. The amides may have a variety of end-groups such as carboxyl groups, amino groups, hydroxyl groups and ester groups which are reactive to at least some extent at elevated temperatures with the copolyetheresters. If amides containing such reactive end-groups are introduced into the polyesterification reaction for the preparation of the copolyetherester, the amide will be largely incorporated into the copolyetherester polymer backbone. If the amide is melt blended with finished copolyetherester, then incorporation of the amide into the copolyetherester backbone is usually incomplete. As previously indicated the amide is effective in preventing oxidative degradation if present either as a physical mixture in the copolyetherester or as part of the copolyetherester backbone.

Polyamides having inert end-groups such as those resulting from capping an amide with a monofunctional amine or carboxylic acid can also be used in the present invention. Reaction between such polyamides and the copolyetherester is negligible unless the polyamide contains more reactive linkages such as ester linkages in addition to the amide linkages.

Mono- and bisamides are in general less effective as stabilizers in the present compositions than are higher homologs unless they contain reactive end-groups or linkages which undergo ester interchange reactions with the copolyetherester.

Representative mono- and bisamides having reactive end-groups include bis ester mono- or diamides or their corresponding carboxylic acid derivatives having the general formula

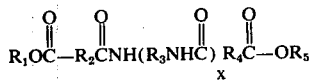

wherein $R_1$ and $R_5$ are hydrogen, alkyl (including cycloalkyl) or aryl and $R_2$, $R_3$ and $R_4$ are alkylene (including cycloalkylene) or arylene and $x$ is 0 or 1; dihydroxy mono- or diamides having the general formula

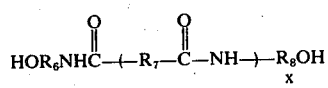

wherein $R_6$ and $R_8$ are alkylene (including cycloalkylene), $R_7$ is alkylene or arylene and $x$ is 0 or 1; hydroxy ester monoamides or corresponding carboxylic acid derivatives having the general formula

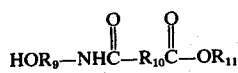

wherein $R_9$ is alkylene, $R_{10}$ is alkylene or arylene and $R_{11}$ is hydrogen, alkyl or aryl; and reaction products of lactams with dicarboxylic acids and derivatives thereof represented by the general formulas

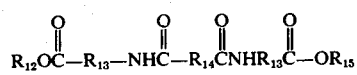

wherein $R_{12}$ and $R_{15}$ are hydrogen, alkyl and aryl, $R_{13}$ is alkylene and $R_{14}$ is alkylene or arylene. Especially preferred diamides having reactive end-groups are the lower alkyl ($C_1$–$C_4$) esters of N,N'-bis(5-carboxyvaleroyl)hexamethylene diamine and N,N'-bis(9-carboxynonanoyl)hexamethylene diamine, N,N'-bis(β-hydroxyethyl)adipamide, N,N'-bis(β-hydroxyethyl)sebacamide and N,N'-bis(4-carboalkoxybenzoyl)hexamethylenediamine.

Representative mono- and diamides which are not reactive include N,N'-dialkyl diamides such as N,N'-dialkyl adipamide and N,N'-dialkyl sebacamide, diacyl diamines such as N,N'-dihexanoyl hexamethylenediamine, N-butyl benzamide and N-ethyl-γ-phenylpropionamide.

A special class of inactive mono- and diamides which contain antioxidant moieties will be described hereinafter.

Representative polyamides containing an average of about 3 or more amide linkages per molecule which may be employed in the present invention include superpolyamides commonly known as nylons and lower molecular weight homologues thereof. These include polyamide types which yield dicarboxylic acids and diamines on hydrolysis such as poly(hexamethylene sebacamide) and those which yield omega-amino mono-carboxylic acids on hydrolysis such as poly(ε-caprolactam). Co- and terpolymers derived from mixtures of intermediates are preferred because of their lower melting points and better compatability with the copolyetheresters. Specific examples of superpolyamides include poly(hexamethylene adipamide), poly(hexamethylene sebacamide), poly(ε-aminocaprolactam), poly(hexamethylene dodecanediamide), poly(lauryl lactam), poly(11-undecane amide), poly(2,4,4-(2,2,4-)trimethylhexamethylene adipamide), polyamides derived from dimer acids and aliphatic diamines, copolyamides containing ε-caprolactam and hexamethylene adipamide units, terpolymers containing ε-caprolactam, hexamethylene adipamide and hexamethylene sebacamide units and terpolymers containing ε-caprolactam, hexamethylene adipamide and 4,4'-dicyclohexylmethane adipamide units.

In addition to polyamides of the nylon type, polymers containing linkages other than the amide linkage such as polyesteramides may be used to prepare the compositions of this invention. These materials are preferably incorporated after preparation of the copolyetherester.

A further class of polyamides which are useful in the present invention are those polyamides derived by the polymerization of ethylene derivatives containing amide linkages which yield a primary amino group and a carboxyl group in hydrolysis. Representative polymers include poly-(N-alkyl methacrylamide and poly-(N-alkylacrylamide).

As previously indicated, a specially preferred embodiment of the present invention involves the use of a suitable antioxidant in amounts up to about 5% by weight of the copolyetherester, e.g. 0.2 to 5.0% by weight in addition to the amide. Preferably, the antioxidant is employed in amounts of about 0.5 to 3.0% by weight of the copolyetherester. Specific classes of preferred antioxidants are the arylamines and the hindered phenols.

Representative arylamine antioxidants include:

Diarylamines such as phenyl naphthylamines, octylated diphenylamine, 4,4'-dimethoxydiphenylamines, 4,4'-bis(α,α-dimethylbenzyl)diphenylamine and 4-isopropoxydiphenylamine;

p-Phenylenediamine derivatives such as N,N'-bis-1-methylheptyl-p-phenylenediamine, N,N'-di-beta-naphthyl-p-phenylenediamine, N,N'-diphenyl-p-phenylenediamine, N-cyclohexyl-N'-phenyl-p-phenylenediamine, and N-sec-butyl-N'-phenyl-p-phenylenediamine; and Ketone aldehyde amine condensates such as polymerized 1,2-dihydro-2,2,4-trimethylquinoline, 6-ethoxy-1,2-dihydro-2,2,4-trimethylquinoline, diphenylamine-acetone condensation products, N-phenyl-β-naphthylamine-acetone condensation products, butyraldehyde-aniline condensation products and aldol-α-naphthylamine.

Of the arylamine antioxidants 4,4'-bis(α,α-dimethylbenzyl)diphenylamine is especially preferred.

Hindered phenol antioxidants are generally characterized by the presence of one or more radicals having the formula

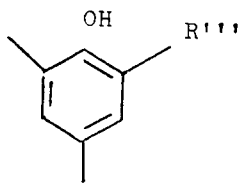

wherein R''' is a secondary or more preferably a tertiary alkyl group. Representative hindered phenol antioxidants include:

Monohydric phenols such as 2,6-di-tert-butyl-4-methylphenol, butylated p-phenyl-phenol and 2-(α-methylcyclohexyl)-4,6-dimethylphenol;

Bis-phenols such as 2,2'-methylenebis-(6-tert-butyl-4-methylphenol), 4,4'-bis(2,6-di-tert-butylphenol), 4,4'-methylenebis(6-tert-butyl-2-methylphenol), 4,4'-butylene-bis(6-tert-butyl-3-methylphenol), 4,4'-methylenebis(2,6-di-tert-butylphenol), 4,4'-thiobis(6-tert-butyl-2-methylphenol), and 2,2'-thiobis(4-methyl-6-tert-butylphenol);

Tris-phenols such as 1,3,5-tris(3,5-di-tert-butyl-4-hydroxyhydrocinnamoyl)-hexahydro-s-triazine, 1,3,5-trimethyl-2,4,6-tris(3,5-di-tert-butyl-4-hydroxybenzyl)benzene and tri(3,5-di-tert-butyl-4-hydroxyphenyl)phosphite; and Amide-containing phenolic antioxidants such as those described in U.S. Pat. No. 3,584,047 to Dexter et al. These materials are characterized by the presence of from 1 to 4 amide linkage-containing moieties having the following general structure:

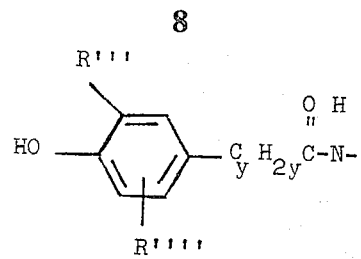

wherein R''' is secondary or tertiary alkyl, R'''' is hydrogen or alkyl, y is zero to six. Generally preferred antioxidant of this type is 1,6-bis[3-(3,5-di-tert-butyl-4-hydroxyphenyl)-propionamido] hexane.

Of the hindered phenol antioxidants, 1,3,5-tris-(3,5,-di-tert-butyl-4-hydroxyhydrocinnamoyl)hexahydro-s-triazine and 1,6-bis[3-(3,5-di-tert-butyl-4-hhydroxyphenyl)propionamido] hexane are especially preferred.

The copolyesters described herein can be made conveniently by a conventional ester interchange reaction. A preferred procedure involves heating the dicarboxylic acid, or an ester thereof e.g. dimethyl ester of terephthalic acid with a long chain glycol, e.g., poly(tetramethylene oxide)glycol having a molecular weight of about 600–2,000 and a molar excess of diol, e.g. 1,4-butanediol in the presence of a catalyst at about 150°–260°C. and a pressure of 0.5 to 5 atmospheres, preferably ambient pressure, while distilling off methanol formed by the ester interchange. Depending on temperature, catalyst, glycol excess, and equipment, this reaction can be completed within a few minutes e.g., 2 minutes to a few hours, e.g. 2 hours.

Concerning the molar ratio of reactants, at least about 1.1 mole of diol should be present for each mole of acid, preferably at least about 1.25 mole of diol for each mol of acid. The long chain glycol should be present in the amount of about 0.0025 to 0.85 mole per mole of dicarboxylic acid, preferably 0.01 to 0.6 mole per mole of acid.

This procedure results in the preparation of a low molecular weight prepolymer which can be carried to the high molecular weight copolyetherester of this invention by the procedure described below. Such prepolymers can also be prepared by a number of alternate esterification or ester interchange processes; for example, the long chain glycol can be reacted with a high or low molecular weight short chain ester homopolymer or copolymer in the presence of catalyst until randomization occurs. The short chain ester homopolymer or copolymer can be prepared by ester interchange from either the dimethyl esters and low molecular weight diols, as above, or from the free acids with the diol acetates. Alternatively, the short chain ester copolymer can be prepared by direct esterification from appropriate acids, anhydrides, or acid chlorides, for example, with diols or by other processes such as reaction of the acids with cyclic ethers or carbonates. Obviously, the prepolymer might also be prepared by running these processes in the presence of the long chain glycol.

The resulting prepolymer is then carried to high molecular weight by distillation of the excess of short chain diol. This process is known as "polycondensation."

Additional ester interchange occurs during this polycondensation which serves to increase the molecular weight and to randomize the arrangement of the copolyetherester units. Best results are usually obtained when this final distillation or polycondensation is run at less than about 5mm. pressure and about 200–270°C for less than about 2 hours e.g. 0.5 to 1.5 hours.

Most practical polymerization techniques rely upon ester interchange to complete the polymerization reaction. In order to avoid excessive hold time at high temperatures with possible irreversible thermal degradation, a catalyst for the ester interchange reaction should be employed. While a wide variety of catalysts can be employed, organic titanates such as tetrabutyl titanate used along or in combination with magnesium or calcium acetates are preferred. Complex titanates, such as $Mg[HTi(OR)_6]_2$, derived from alkali or alkaline earth metal alkoxides and titanate esters are also very effective. Inorganic titanates, such as lanthanum titanate, calcium acetate/antimony trioxide mixtures and lithium and magnesium alkoxides are representative of other catalysts which can be used.

The catalyst should be present in the amount of 0.005 to 0.2% by weight based on total reactants.

Ester interchange polymerizations are generally run in the melt without added solvent, but inert solvents can be used to facilitate removal of volatile components from the mass at low temperatures. Ths technique is especially valuable during prepolymer preparation, for example, by direct esterification. However, cerain low molecular weight diols, for example, butane diol in terphenyl, are conveniently removed during high polymerization by azeotropic distillation. Both bath and continuous methods can be used for any stage of copolyetherester polymer preparation. Polycondensation of prepolymer can also be accomplished in the solid phase by heating divided solid prepolymer in a vacuum or in a stream of inert gas to remove liberated low molecular weight diol. This method has the advantage of reducing degradation because it must be used at temperatures below the softening point of the prepolymer.

The dicarboxylic acids or their derivatives and the polymeric glycol are incorporated into the final product in the same molar proportions as are present in the ester interchange reaction mixture. The amount of low molecular weight diol actually incorporated corresponds to the difference between the moles of diacid and polymeric glycol present in the reaction mixture. When mixtures of low molecular weight diols are employed, the amounts of each diol incorporated is largely a function of the amounts of the diols present, their boiling points, and relative reactivities. The total amount of diol incorporated is still the difference between moles of diacid and polymeric glycol.

Most preferred copolyesters which are stabilized by the process of this invention are those prepared from dimethyl terephthalate, 1,4-butanediol, and poly(tetramethylene oxide) glycol having a molecular weight of about 600–2000 or poly(ethylene oxide) glycol having a molecular weight of about 600–1500. Optionally, up to about 30 mole % and preferably 5–20 mole % of the dimethyl terephthalate in these polymers can be replaced by dimethyl phthalate or dimethyl isophthalate. Other preferred copolyesters are those prepared from dimethyl terephthalate, 1,4-butanediol, and poly(propylene oxide) glycol having a molecular weight of about 600–1600. Up to 30 mole % and preferably 10–25 mole % of the dimethyl terephthalate can be replaced with dimethyl isophthalate or butanediol can be replaced with neopentyl glycol until up to about 30% and preferably 10–25% of the short chain ester units are derived from neopentyl glycol in these poly(propylene oxide) glycol polymers. The polymers based on poly(tetramethylene oxide) glycol are especially preferred because they are easily prepared, have overall superior physical properties, and are especially resistant to water.

The most preferred copolyetherester compositions also contain (A) 0.5 to 3 weight percent of an antioxidant, preferably 4,4'-bis ($\alpha,\alpha$-dimethylbenzyl)diphenylamine, 1,3,5-tris(3,5-ditert-butyl-4-hydroxyhydrocinnamoyl)hexahydro-s-triazine or 1,6-bis[3-(3,5-di-tert-butyl-4-hydroxyphenyl)propionamido]hexane and (B) 0.5 to 3.0 weight percent of amide linkages, preferably provided by a copolymer of polycaprolactam and polyhexamethylene adipamide or terpolymer of polycaprolactam, polyhexamethylene adipamide and polyhexamethylene sebacamide. Another preferred amide type is a bis ester amide such as N,N'-bis(5-carboalkoxyvaleroyl)-hexamethylene diamine which is preferably introduced into the copolyetherester during its preparation and forms a part of the polymer backbone.

The antioxidant and the amide may be added at any time during the preparation of the copolyetherester or following its preparation. Preferably an antioxidant should be present during the polycondensation aspect of the reaction in an amount of at least about 0.2% by weight based on the estimated yield of copolyetherester product, preferably in an amount of 0.5 to 3.0% by weight. It is preferred that a suitable antioxidant be present at any point in the process where the poly(alkylene oxide) glycol is exposed to elevated temperatures, e.g. above about 100°C. The antioxidant, depending on its melting point, may be added as a solid, a molten liquid, or as a solution or dispersion in one or more of the reactants. In batch operation, it is conveniently added as a solid or as a solutuion or dispersion in the diol or the poly(alkylene oxide) glycol at the time of charging the reactor. In continuous operation, the antioxidant is most conveniently added as a solution or dispersion in the diol and/or glycol entering the process. The antioxidant may, of course, be introduced at later stages in the process and even after preparation of the copolyetherester is complete. It is usually convenient to add the total amount of antioxidant desired in the finished copolyetherester during its preparation; however, additional amounts of antioxidant can be added to the finished copolyetherester by melt blending.

During the preparation of the copolyetherester the antioxidant prevents oxidative degradation (resulting from air inleakage) of the reactants and the polymer as it is being formed. The preferred antioxidants do not interfere with transesterification or interact with transesterification catalysts. Because oxidative degradation is substantially eliminated during the polymerization, a more uniform product of higher quality, as indicated by improved inherent viscosity, is obtained. The color of the product is also superior.

As previously indicated the amide may also be added during the preparation of the copolyetherester by ester interchange. When the amide is introduced into the polyester-forming reaction, the ultimate in uniformity of distribution throughout the copolyetherester is obtained. In the case of amides with reactive end groups, e.g., bis ester amides, the amide will be incorporated into the backbone of the copolyetherester. An additional advantage is the avoidance of a separate blending step following copolyetherester preparation. When solid phase polymerization is employed it is definitely preferred that the amide be present in the low molecular weight copolyetherester subjected to solid phase polymerization. In continuous operation, lower melting superpolyamides (see the copolyamides and terpolyamides described hereinbefore) are conveniently introduced into the ester interchange reaction as a solution in methanol, ethylene glycol or 1,4-butanediol.

Alternatively, the copolyetherester may be prepared (with or without the antioxidant present) with the amide added only after copolyetherester formation has been completed. The amide may also be added partly during the preparation and partly after preparation is completed.

In the case where the amide is to be added after the copolyetherester has been completed the following procedures are illustrative. For best results, the two components must be thoroughly and uniformly blended, otherwise localized areas will differ in properties. The compositions may be prepared by adding the amide to copolyetherester which has been heated to a temperature sufficient to soften or melt the copolyetherester and agitating until the amide is incorporated. The temperature required to soften or melt the copolyetherester depends on the particular copolyetherester, but generally will be in the range of 150°–280°C. Generally, it is preferred to use the lowest temperature which will permit the means of agitation available to be effective; however, with high melting amides higher temperatures may be required. For example, if agitation is limited to that provided by a close-fitting paddle stirrer in a kettle, the copolyetherester will have to be heated somewhat above its melting point to lower its viscosity. If more powerful agitation is available, such as that provided by heated rubber mills, internal mixers (Banbury mixer) or single or twin screw extruders, temperatures near the softening point or melting point of the copolyetherester can be used. If desired, solvents or plasticizers can be used to assist in mixing the amide with the copolyetherester at lower temperatures. A particularly convenient procedure for preparing the compositions consists of dry blending the amide with the copolyetherester in granular or pellet form and incorporating the amide into the copolyetherester in an extruder.

The resulting product has improved resistance to oxidative degradation at temperatures in excess of 120°C. The especially preferred compositions of this invention which contain an antioxidant in combination with an amide, can be employed at temperatures as high as 180°C for extended periods of time. Illustrative uses of the compositions include hydraulic hose tubes and covers, wire and cable insulation and gaskets requiring high service temperatures. Use of the compositions in the presence of solvents such as hydraulic fluids does not interfere with the ability of the compositions to resist degradation.

Properties of these heat stabilized copolyetherester compositions can also be modified by incorporation of various conventional organic fillers, such as carbon black, silica gel, alumina, clays and chopped fiber glass. White or light colored fillers are preferred with the non-discoloring compositions of this invention. In general, these additives have the effect of increasing the modulus of the material at various elongations. Compounds having a range of hardness values can be obtained by blending hard and soft copolyetheresters of this invention.

All parts, proportions and percentages disclosed herein are by weight unless otherwise indicated.

The following examples further illustrate the invention:

The following ASTM methods are employed in determining the properties of the polymers prepared in the examples which follow:

| | |
|---|---|
| Modulus at 100% elongation*, $M_{100}$ | D412 |
| Modulus at 300% elongation*, $M_{300}$ | D412 |
| Modulus at 500% elongation*, $M_{500}$ | D412 |
| Tensile at Break*, $T_B$ | D412 |
| Elongation at Break*, $E_B$ | D412 |
| Flexural Modulus | D797 |
| Hardness, Shore D | D1484 |
| Heat Aging** | D865 |
| Weather-O-Meter Aging | D750 |
| Oil Swell | D471 |
| Melt Index*** | D1238 |

*Cross-head speed 2"/minute if not stated otherwise
**All heat aging experiments were carried out with dumbbell shaped test specimens as described in ASTM D412. If not stated otherwise, the thickness of the test specimens was 45–48 mil.
***2160 g load, drying conditions: 1 hour at 135°C/0.2 mm Hg.

The useful polymer life at the specified aging temperatures is determined by the 180° bend test. In this test the dumbbell shaped test specimen as described in ASTM method D412, is removed from the heat aging tubes and kept at room temperature for about 10 minutes. Then the dumbbell is bent in both directions until the ends touch each other. If the test specimen breaks during this procedure, it failed in the 180° bend test.

Inherent viscosities of the polymers in the following examples are measured at 30°C. at a concentration of 0.1g./dl. in m-cresol.

The following catalyst is used in preparing the copolyesters of the examples:

CATALYST

To 425 parts of anhydrous 1,4-butanediol in a round bottom flask is added 23.32 parts of tetrabutyl titanate. The nixture is agitated at 50°C for 2–3 hours until the small amount of solids originally present disappear.

Copolyester A is prepared by placing the following materials in an agitated flask fitted for distillation:

| | | |
|---|---|---|
| Polytetramethyleneether glycol; number average molecular weight about 975 | 10.75 | parts |
| 1,4-Butanediol | 28.0 | parts |
| Dimethyl terephthalate | 36.45 | parts |
| Dimethyl phthalate | 3.65 | parts |
| 4,4'-bis (alpha,alpha-dimethylbenzyl) diphenylamine | 0.57 | parts |
| Catalyst | 1.1 | parts |

A stainless steel stirrer with a paddle cut to conform with the internal radius of the flask is positioned about one-eighth inch from the bottom of the flask and agitation is started. The flask is placed in an oil bath at 160°C, agitated for 5 minutes and then the catalyst is added. Methanol distills from the reaction mixture as the temperature is slowly raised to 250°C over a period of 1 hour. When the temperature reaches 250°C, the pressure is gradually reduced to 0.3 mmHg within 20 minutes. The polymerization mass is agitated at 250°C/0.3 mmHg for 35 minutes. The resulting viscous molten product is scraped from the flask in a nitrogen (water and oxygen free) atmosphere and allowed to cool. The inherent viscosity of the product at a concentration of 0.1g./dcl. in m-cresol at 30°C is 1.35. Samples for heat aging and physical testing are prepared by compression molding at about 240°C for 1 minute and cooling rapidly in the press. The polymer has a Shore D hardness of about 63.

Copolyester B containing a lower proportion of short chain ester units is prepared by substantially the same procedure from the following materials:

| | | |
|---|---|---|
| Polytetramethyleneether glycol; number average molecular weight about 975 | 38.5 | parts |
| 1,4-Butanediol | 36.5 | parts |
| Dimethyl terephthalate | 60.0 | parts |
| 4,4'-bis (alpha,alpha-dimethylbenzyl) diphenylamine | 1.05 | parts |
| Catalyst | 2.1 | parts |

The polymer has an inherent viscosity of 1.40 and a Shore D hardness of 55.

Copolyester C is prepared according to the following procedure:

In an agitated reactor fitted with a distillation column, 384g of ethylene glycol, 572 g. of dimethyl terephthalate, 2.6 g. of sym-di-beta-naphthyl-phenylene diamine and 18 ml. of Catalyst are agitated and heated. Reflux rate was adjusted so that the temperature at the head of the distillation column was maintained at 70°C. while methanol was removed. When substantially all of the methanol had been removed, the head temperature rises abruptly to about 180°C. Heating and distillation of ethylene glycol were continued until the temperature in the reactor reached 230°C. The reaction mixture was allowed to cool to 185°C and 342 g. of poly(-tetramethylene oxide) glycol having a number average molecular weight of about 1,000 was added. The flask was immersed in a 250°C. oil bath and the mixture was agitated for 5 minutes under nitrogen. While maintaining the oil bath at 250°C., full vacuum was carefully applied to the system. After stirring for 60 minutes at a reduced pressure of 0.22 mm Hg. the polymer was removed from the flask under nitrogen. The polymer had an inherent viscosity of about 1.33 dl/g and a Shore D hardness of 55D.

Polyamide A is a terpolymer consisting of approximately 43% polycaprolactam/33% polyhexamethylene adipamide/24% polyhexamethylene sebacamide. The polymer has a melt index of 5.5g./10 min. measured at 220°C. and an amide content of 32.5%.

Polyamide B consists of extracted polycaprolactam having a melt index of 15.8 g./10 min. measured at 250°C. and an amide content of 37.6%.

Polyamide C is a copolymer consisting of approximately 64% polycaprolactam and 36% polyhexamethylene adipamide. The copolymer has a melt index of 10.2 g./10 min. measured at 220°C and an amide content of 37.7%.

EXAMPLE 1

A. Copolyester A was prepared as described above except that 4,4'-bis ($\alpha,\alpha$-dimethylbenzyl)diphenylamine was substituted by 2.75 parts of Polyamide A. The resulting polymer had an inherent viscosity of 1.42 dl./g. and an amide content of 1.54%.

B. For control purposes the preparation of Copolyester A was repeated without any stabilizer present. The inherent viscosity of the control polymer was 1.60 dl./g.

46 mil dumbbells of both polymers were heat aged at 121°C for 41 hours. The physical properties of both compositions before and after heat aging are summarized in Table I.

TABLE I

ORIGINAL PROPERTIES

| | Polymer 1A | Control Polymer 1B |
|---|---|---|
| $M_{100}$, psi | 2,550 | 2,420 |
| $M_{300}$, psi | 3,500 | 3,320 |
| $T_B$, psi | 6,500 | 7,000 |
| $E_B$, % | 520 | 550 |
| Hardness, Shore D | 63 | 63 |
| Flexural modulus, psi | 56,500 | 54,000 |
| Properties after heat aging | | |
| $T_B$, psi | 1,520 | too degraded for testing |
| $E_B$, % | 30 | |
| 180° bend test | passed | failed |

The data show that polymer composition 1A has retained after heat aging 23% of its original tensile strength and was still functional as indicated by the results of the 180° bend test. On the other hand, control polymer 1B was completely degraded when exposed to the same heat aging conditions and was no longer a useful polymer.

EXAMPLE 2

Various amounts of Polyamide A were mixed under nitrogen with Copolyester A by melting the polymer mixture in the reactor described in Example 1 at 240°C and agitating the viscous polymer melt for 10–15 minutes. The resulting polymer compositions were aged at 177°C and their useful polymer life based on the 180° bend test was determined. The test results of these experiments are reported in Table II.

TABLE II

| Polyamide Level phr | Amide Content % | Polymer Life at 177°C days |
|---|---|---|
| none | none | 3 |
| 0.1 | 0.032 | 5 |
| 0.5 | 0.16 | 7 |
| 0.9 | 0.29 | 9 |
| 2.0 | 0.636 | 13 |
| 5.0 | 1.54 | 17 |
| 10.0 | 2.95 | 18 |
| 25.0 | 6.5 | 12 |

EXAMPLE 3

455 parts of dry Copolyester B and 22.75 parts of dry Polyamide A were dry-blended in granular form and mixed in a single screw extruder at 220°C.

46 mil dumbbells of the polymer composition of this example were aged at 150°C together with a control polymer consisting of polyamide-free Copolyester B. The results are shown below:

TABLE III

| Original Properties* | Polyamide Stabilized Polymer | Control (Without Polyamide) |
|---|---|---|
| $M_{100}$, psi | 2,120 | 2,075 |

TABLE III-Continued

| Original Properties* | Polyamide Stabilized Polymer | Control (Without Polyamide) |
|---|---|---|
| $M_{300}$, psi | 2,400 | 2,360 |
| $M_{500}$, psi | 3,510 | 3,610 |
| $T_B$, psi | 5,400 | 5,960 |
| $E_B$, % | 700 | 720 |
| Properties* After Heat Aging at 150°C for | 49 days | 18 days |
| $T_B$ | 2,720 | too degraded for testing |
| $E_B$ | 50 | |
| 180° bend test | passed | failed |

*Cross-head speed 20"/min.

Essentially the same results were obtained when Polyamide A was substituted by Polyamide C.

When the procedure of Example II is repeated with Copolyester C instead of Copolyester B substantially the same improvement is obtained.

EXAMPLE 4

The extruder blending operation described in Example 3 was repeated with Copolyester A and Polyamide A and Polyamide B, respectively, in the following proportions:

|  | 4A | 4B |
|---|---|---|
| Copolyester A, parts | 450 | 450 |
| Polyamide A, parts | 22.5 | — |
| Polyamide B, parts | — | 22.5 |

For control purposes Copolyester A without polyamide modification was used (4C). Dumbbell shaped test specimens died out from 80 mil compression molded slabs were aged for 14 days at 150°C, immersed in ASTM No. 1 oil. The physical properties before and after aging are given in Table IV.

TABLE IV

| Original Properties | 4A | 4B | Control 4C |
|---|---|---|---|
| $M_{100}$, psi | 2,580 | 2,800 | 2,475 |
| $T_B$, psi | 6,130 | 6,850 | 6,600 |
| $E_B$, % | 580 | 580 | 530 |
| Properties at 25°C After Immersion for 14 Days at 150°C in ASTM No. 1 Oil | | | |
| $M_{100}$, psi | 2,850 | 2,900 | — |
| $T_B$, psi | 3,500 | 3,650 | 1,200 |
| $E_B$, % | 365 | 460 | 5 |
| 180° bend test | passed | passed | failed |

Substantially the same results were obtained after aging in ASTM No. 3 oil for 14 days at 150°C.

EXAMPLE 5

A. A polyamide stabilized copolyester was prepared by substantially the same procedure as given for Copolyester A from the following materials:

| | | |
|---|---|---|
| Polytetramethyleneether glycol: number average molecular weight about 975 | 205 | parts |
| 1,4-Butanediol | 600 | parts |
| Dimethyl terephthalate | 762 | parts |
| Dimethyl phthalate | 139 | parts |
| 4,4'-bis (alpha, alpha-dimethylbenzyl) diphenylamine | 12.25 | parts |
| Polyamide B | 61 | parts |
| Catalyst | 24.5 | parts |

B. For control purposes the preparation of above polymer was repeated except that the polyamide was omitted from starting materials.

The physical properties of both polymer compositions before and after heat aging at 177°C are shown below:

TABLE V

| Original Properties | Polyamide Stabilized Polymer 5A | Control 5B (Without Polyamide) |
|---|---|---|
| Inherent viscosity, dl./g | 1.33 | 1.53 |
| $M_{100}$, psi | 2,550 | 2,300 |
| $M_{300}$, psi | 3,800 | 3,450 |
| $M_{500}$, psi | 6,500 | 7,000 |
| $T_B$, psi | 6,500 | 8,400 |
| $E_B$, % | 500 | 550 |
| Flexural modulus, psi | 48,600 | 44,500 |
| Properties After Heat Aging for 4 Days at 177°C | | |
| $T_B$, psi | 3,040 | 2,000 |
| $E_B$, % | 150 | <10 |
| 180° bend test | passed | failed |
| $T_B$, psi | 2,650 | — |
| $E_B$, % | 100 | — |
| 180° bend test | passed | — |

Polymer A eventually failed in the 180° bend test after heat aging at 177°C for 24 days.

EXAMPLE 6

A. The preparation of Copolyester A was repeated except that the polytetramethyleneether glycol was substituted by the same amount of polyethyleneether glycol (PEG) having a number average molecular weight of about 1000 and 2.75 parts of Polyamide A was charged with the starting materials (6A).

As a control, the same polymer was prepared without the polyamide (6A–C).

B. The preparation of Copolyester 6A was repeated except that the polyethyleneether glycol was substituted by the same amount of polypropyleneether glycol (PPG) having a number average molecular weight of about 1025 (6B).

For control purposes the same composition without the polyamide was prepared (6B–C).

The useful polymer life at 177°C determined by the 180° bend test is shown in the following table:

TABLE VI

| Polymer Composition | Initial Inherent Viscosity dl./g. | Polymer Life at 177°C days |
|---|---|---|
| Polyamide stab. PEG polymer (6A) | 1.44 | 16 |
| PEG Control (6A–C) | 1.54 | 3 |
| Polyamide stab. PPG polymer (6B) | 1.20 | 17 |
| PPG control (6B–C) | 1.21 | 3 |

EXAMPLE 7

The procedure of Example 2 was repeated and the following polyamides were mixed with Copolyester A at a 5 phr level:

unextracted poly-ε-caprolactam (A)

-Continued

| | |
|---|---|
| poly(hexamethylene dodecane diamide) | (B) |
| POLY LAURYL LACTAM | (C) |
| poly(omega-undecane amide) | (D) |

As control polymer Copolyester A without polyamide was used (E).

The useful life of these polymers at 177°C as determined by the 180° bend test is shown in Table VII.

TABLE VII

| Polymer Composition | Initial Inherent Viscosity (dl./g.) | Polymer Life at 177°C days |
|---|---|---|
| A | 1.25 | 12 |
| B | 1.17 | 15 |
| C | 1.12 | 16 |
| D | 1.10 | 14 |
| E (control) | 1.35 | 3 |

EXAMPLE 8

A. The preparation of Copolyester B was essentially repeated except that 0.53 parts of 1,6-bis[3-(3,5-ditert. butyl-4-hydroxyphenyl) propionamide]hexane (0.5 wt. %) was used as stabilizer instead of 1.05 parts of 4,4'-bis(alpha, alpha-dimethylbenzyl) diphenylamine (1.0 wt. %).

B. For control purposes Copolyester B was used. Both polymer compositions were aged at 150°C and in a Weather-O-Meter, the results are summarized below:

TABLE VIII

| Original Properties | 7A | 7B (Control) |
|---|---|---|
| Melt index (220°C), g/10 min. | 16.7 | 17.0 |
| $T_B$, psi | 4,950 | 4,825 |
| $E_B$, % | 705 | 700 |
| Properties* After Heat Aging At 150°C for 1 Week | | |
| $T_B$, psi | 1,850 | 650 |
| $E_B$, % | 110 | 10 |
| Properties* After 100 Hours Weather-O-Meter Exposure | | |
| $T_B$, psi | 2,250 | 2,100 |
| $E_B$, % | 260 | 80 |

*test specimen: 80 mil dumbbells

EXAMPLE 9

A. The preparation of Copolyester B was essentially repeated except that 1.05 parts of 1,3,5-tris(3,5-ditert.-butyl-4-hydroxy hydrocinnamoyl) hexahydro-s-triazine (1.0 wt. %) was used as stabilizer instead of the same amount of 4,4'-bis(alpha, alpha-dimethylbenzyl)-diphenylamine. The resulting composition had an inherent viscosity of 1.56 dl./g. and was used as a control polymer.

B. 55 parts of Copolyester 9A was mixed with 2.75 parts of Polyamide A at 240°C as described in Example 2 and yielded a polymer blend having an inherent viscosity of 1.60 dl./g.

Both polymer compositions were heat aged at 150°C for 7 days and tested at 24°C. After this aging period Polymer 9B had retained 50% of its original tensile strength and 71% of the elongation at break. On the other hand, the prior art polymer 9A retained only 23% of its tensile strength and 1.5% of the original elongation at break after heat aging for the same length of time.

EXAMPLE 10

The preparation of Copolyester A was repeated except that 4,4'-bis(alpha, alpha-dimethylbenzyl)diphenylamine was substituted by different stabilizers. The stabilizers were either added with the other starting materials or mixed in at the end of the polymerization after releasing the vacuum under nitrogen as shown in the following table.

TABLE IX

| | Stabilizer | Stabilizer Level wt. % | Method of Preparation |
|---|---|---|---|
| A.) | sym-di-beta-naphthyl-phenylene diamine | 0.3 | addition with starting materials |
| B.) | N,N'-diphenyl-p-phenylene diamine | 1.0 | post addition |
| C.) | dioctyl diphenylamine | 1.0% | addition with starting materials |
| D.) | Phenyl-alpha-naphthylamine | 1.0% | post addition |

Each polymer composition was modified by incorporation of 5 phr of Polyamide A as described in Example 2 and the heat aging characteristics at 177°C were compared with the performance of the corresponding polyamide-free polymer. The results are summarized in Table X.

TABLE X

| | Polymer Life* at 177°C (days) | |
|---|---|---|
| Composition | Polyamide Stab. Polymer | Control (without Polyamide) |
| A | 5 | 3 |
| B | 10 | 4 |
| C | 12 | 3 |
| D | 9 | 3 |

*based on 180° bend test

EXAMPLE 11

A. A mixture of dimethyl adipate (2.48 parts) and 1,10-diamino decane (1.23 parts) was heated in a reactor at 160°C with agitation for 3 hours while methanol was removed by distillation. To the resulting bis ester amide the starting materials specified for the preparation of Copolyester A were added and a copolyesteramide was prepared according to the general procedure given for Copolyester A. The resulting polymer had an inherent viscosity of 1.30 dl./g. and an amide content of 0.98%.

B. The preparation of Copolyester A was repeated except that in addition to the starting materials specified 3.82 parts of N,N'-bis (p-carbobutoxybenzoyl)-hexamethylene diamine* was added. The copolyesteramide obtained had an inherent viscosity of 1.39 dl./g. and an amide content of 1.17%.

*prepared according to the procedure given by J. L. R. Williams et. al., J. Org. Chem. 25, 817 (1960)

C. For control purposes Copolyester A was used.

The physical properties of the three polymer compositions before and after heat aging at 177°C are given in Table XI.

TABLE XI

| Original Properties | Polymer 11A | Polymer 11B | Control 11C |
|---|---|---|---|
| $M_{100}$, psi | 2,400 | 2,480 | 2,420 |
| $M_{300}$, psi | 3,200 | 3,400 | 3,300 |
| $T_B$, psi | 6,650 | 8,500 | 7,000 |
| $E_B$, % | 565 | 590 | 550 |
| Properties After Heat Aging at 177°C for 3 Days | | | |
| $M_{100}$, psi | 2,800 | — | too degraded for testing |
| $T_B$, psi | 2,770 | 3,300 | |
| $E_B$, % | 120 | 40 | |
| 180° bend test | passed | passed | failed |
| Polymer life** at 177°C, days | 14 | 6 | 3 |

*prepared according to the procedure given by J.L.R. Williams et. al., J. Org. Chem. 25, 817 (1960)
**based on 180° bend test Substantially the same results were obtained when Example 11A was repeated with 0.82 parts of 1,6-hexamethylene diamine instead of 1.23 parts of 1,10-diamino decane.

I claim:

1. A stabilized copolyester composition consisting essentially of a mixture of (a) a copolyether ester consisting of a multiplicity of recurring long chain ester units and short chain ester units joined head-to-tail through ester linkages, said long chain ester units being represented by the formula I 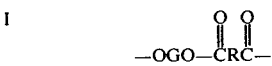

and said short chain units being represented by the formula

II 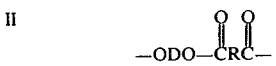

where G is a divalent radical remaining after the removal of terminal hydroxyl groups from a poly(alkylene oxide) glycol having a molecular weight of about 400–6000 and a carbon to oxygen ratio of about 2.0–4.3; R is a divalent radical remaining after removal of carboxyl groups from a dicarboxylic acid or dicarboxylic acid ester having a molecular weight less than about 300 and D is a divalent radical remaining after removal of hydroxyl groups from a diol having a molecular weight less than 250; provided said short-chain ester units amount to about 15–95% by weight of said copolyester (b) an effective concentration of amide linkage containing material which on hydrolysis yields primary amino groups and carboxyl groups and (c) an effective amount of an antioxidant.

2. The composition of claim 1 wherein said antioxidant is an arylamine or a hindered phenol.

3. The composition of claim 1 wherein the copolyetherester contains (c) an effective amount of 4,4'-bis($\alpha,\alpha$-dimethylbenzyl) diphenylamine.

4. In a process for producing the composition of claim 1 which comprises reacting said poly(alkylene oxide) glycol, said dicarboxylic acid and said diol in the presence of an antioxidant and an amide linkage containing compound which amide on hydrolysis yields a primary amino group and a carboxyl group.

5. The process of claim 4 wherein said amide is a superpolyamide.

6. The process of claim 4 wherein said superpolyamide is added as a solution in said diol.

7. The composition of claim 1 wherein the concentration of said amide linkages is about 0.015 to 6.5 weight %.

8. The composition of claim 1 wherein said amide linkages occur in a structure represented by the general formula

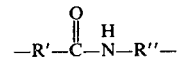

wherein R' and R'' are independently selected from the group consisting of aliphatic or aromatic radicals.

9. The composition of claim 1 wherein said poly(alkylene oxide) glycol is poly(tetramethylene oxide) glycol having a molecular weight of 600–2000, the diol is 1,4-butane diol and the dicarboxylic acid ester is a mixture of dimethyl terephthalate and phthalate.

10. The composition of claim 1 wherein said dicarboxylic acid ester is dimethyl terephthalate.

* * * * *